United States Patent
Graham

(10) Patent No.: US 11,720,340 B2
(45) Date of Patent: Aug. 8, 2023

(54) HASH MAP OF EXECUTABLE CONTROL BLOCKS

(71) Applicant: Hewlett-Packard Development Company, L.P., Spring, TX (US)

(72) Inventor: Christoph Graham, Spring, TX (US)

(73) Assignee: Hewlett-Packard Development Company, L.P.

( * ) Notice: Subject to any disclaimer, the term of this patent is extended or adjusted under 35 U.S.C. 154(b) by 52 days.

(21) Appl. No.: 17/419,016

(22) PCT Filed: Jul. 30, 2019

(86) PCT No.: PCT/US2019/044097
§ 371 (c)(1),
(2) Date: Jun. 28, 2021

(87) PCT Pub. No.: WO2021/021126
PCT Pub. Date: Feb. 4, 2021

(65) Prior Publication Data
US 2022/0156055 A1    May 19, 2022

(51) Int. Cl.
*G06F 8/65* (2018.01)
(52) U.S. Cl.
CPC .................... *G06F 8/65* (2013.01)
(58) Field of Classification Search
USPC ........................................ 717/168
See application file for complete search history.

(56) References Cited

U.S. PATENT DOCUMENTS

| | | | |
|---|---|---|---|
| 8,627,303 B2 | 1/2014 | Adams, III et al. | |
| 9,043,816 B2 | 5/2015 | Brown | |
| 9,519,466 B2 | 12/2016 | Delsart | |
| 9,547,483 B1 | 1/2017 | Boxall et al. | |
| 9,552,193 B2 | 1/2017 | McEwan | |
| 10,416,972 B1* | 9/2019 | Forghani | G06F 8/4441 |
| 2002/0108107 A1 | 8/2002 | Darnell et al. | |
| 2006/0026577 A1* | 2/2006 | Dinechin | G06F 9/45558 717/148 |
| 2006/0085860 A1 | 4/2006 | Zou et al. | |
| 2007/0011666 A1* | 1/2007 | Tan | G06F 9/45516 717/140 |
| 2008/0162783 A1* | 7/2008 | Adatrao | G06F 8/65 711/143 |
| 2008/0216065 A1* | 9/2008 | Oka | G06F 8/65 717/168 |
| 2010/0299661 A1 | 11/2010 | Citron et al. | |

(Continued)

OTHER PUBLICATIONS

Goss C, Machine Code Optimization—Improving Executable Object Code, Ph.D. dissertation, Technical Report #246, Courant Institute of Mathematical Sciences, New York University, Jun. 1986, Revised Aug. 22, 2013, 41 pages.

*Primary Examiner* — Qing Chen
*Assistant Examiner* — Clint Thatcher
(74) *Attorney, Agent, or Firm* — Quarles & Brady LLP

(57) ABSTRACT

In an example implementation according to aspects of the present disclosure, a method for creating a hash map comprising at least one entries corresponding to at least one executable control blocks, storing the execution control blocks in a shared function address space, and executing the at least one executable control blocks based on referencing a corresponding entry in the hash map.

15 Claims, 4 Drawing Sheets

(56) References Cited

U.S. PATENT DOCUMENTS

| | | | |
|---|---|---|---|
| 2011/0145472 A1* | 6/2011 | Whitehouse | G06F 8/65 |
| | | | 711/170 |
| 2015/0040112 A1* | 2/2015 | Valencia | G06F 8/65 |
| | | | 717/168 |
| 2015/0215375 A1* | 7/2015 | Hundt | G06F 8/61 |
| | | | 709/203 |
| 2015/0355898 A1 | 12/2015 | Zhang et al. | |
| 2016/0085523 A1* | 3/2016 | Hall | G06F 8/48 |
| | | | 717/140 |
| 2018/0046446 A1 | 2/2018 | Turovsky et al. | |

* cited by examiner

HASH MAP OF EXECUTABLE CONTROL BLOCKS

BACKGROUND

Computer applications may be written in high level programming language as a group of source documents. A complier may be utilized to parse and convert the group of source documents into an object code. A linker may be utilized in the chain to resolve object code dependencies to library functions stored externally to the group of source documents.

DETAILED DESCRIPTION

Computer programmers often develop software applications utilizing systems-level programming languages such as C/C++, Go or Rust. High level languages allow computer programmers to utilize common constructs to express execution control blocks abstracted from the targeted processor architecture. A backend compiler converts a high-level source code into an object file corresponding to instructions for the targeted processor architecture. The object file includes the translated execution control blocks often implemented as functions. Additionally, after compilation, a linker may resolve execution control blocks utilized in the object file, but not defined or declared in the high-level source code. Often the high-level source code utilizes library functions which are defined and declared outside of the high-level source code. The linker resolves these external dependencies in one of two ways.

The linker may statically link the external library execution control blocks, or the linker my dynamically link the external library. Static linking copies the object code for the target processor architecture into a resultant compiled binary file. Dynamic linking resolves the link to an external binary library file. As a result, static linking may result in a bloated compiled binary file that may include redundant library execution control blocks. Dynamic linking may fail on the executing machine if the requested library is not present, not the correct version, or stored in the wrong location. Described herein is a system to execute a precompiled binary file, create a hash map of referenced execution control blocks, and index into the hash map for the corresponding execution control blocks. The system has the advantage of minimizing code bloat (e.g. deduplication of execution control blocks), better management of dynamically linked execution control blocks, and consistent in-memory patching of execution control blocks.

In one example, the system includes a precompiled binary, a processor and a memory space. The processor parses and scans the precompiled binary for boundaries of execution control blocks. The boundaries may indicate the compiled code inclusive of the execution control blocks including execution control block signature. The processor hashes the corresponding code in the execution control block to create a unique hash signature. The hash signature may then be stored in a hash map, where each hash map corresponds to the execution control block from which it was derived. The processor may execute the precompiled binary, by replacing references to the execution control block to the hash mapped entry. The approach inherently allows the processor to distinguish from two versions of the same execution control block, wherein the signature doesn't change, however the supporting code of the execution control block does.

Figure 1:
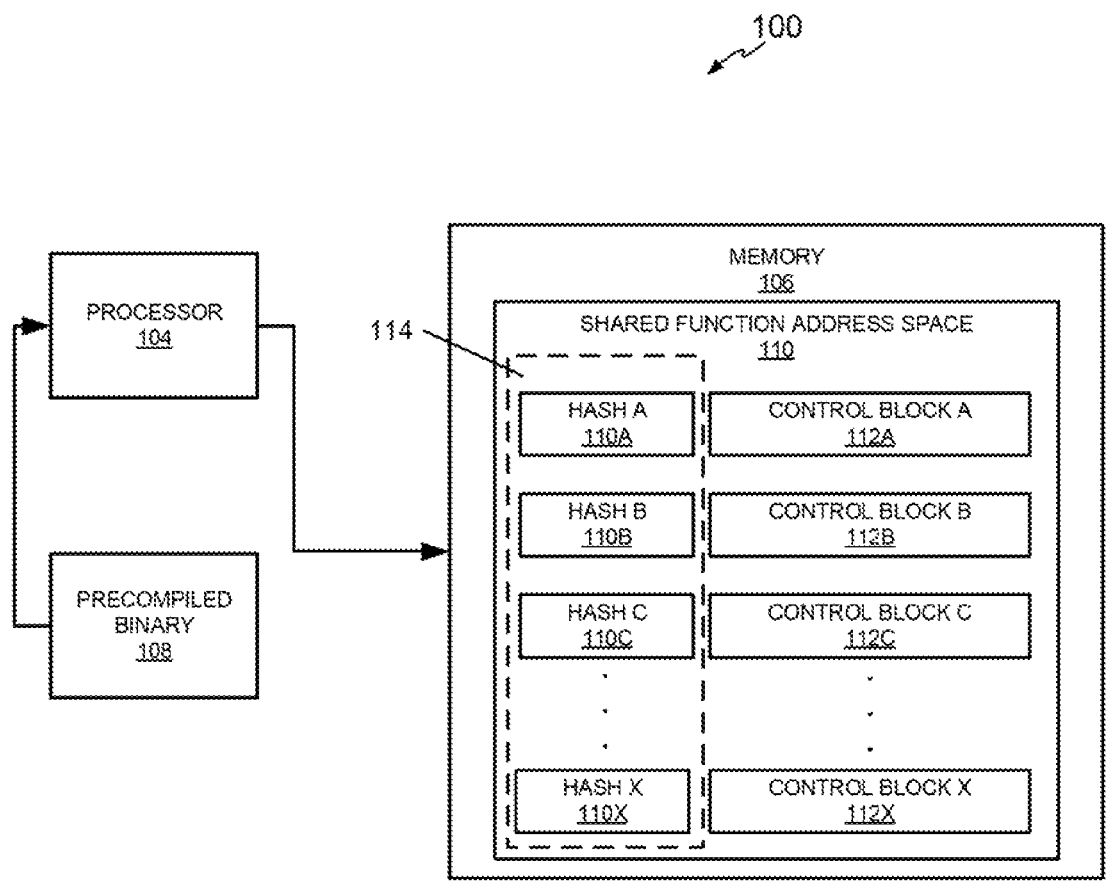
FIG. 1 illustrates a system corresponding for supporting a hash map of executable control blocks, according to an example.

FIG. 1 illustrates a system 100 corresponding for supporting a hash map of executable control blocks, according to an example. The system may include a processor 104, a memory 106, and a precompiled binary file 108. The processor 104 may include a microprocessor that has corresponding support for the compilation of source code into object files or machine code. Correspondingly the processor 104 may also be able to execute the resultant programming from the object files or machine code. The processor 104 may natively process the object files or machine code. The processor 104 may utilize cross compilers to target different processor architectures and utilize an emulation system operable on the processor 104 to emulate execution of the cross compiled code on the different processor architectures. The latter implementation may utilize virtualized systems (e.g. virtual machines) to facilitate execution.

Similar to the processor 104, the memory 106 may be direct accessed memory wherein in the processor 104 read/writes directly to the hardware memory. In another implementation where the processor 104 may be emulated, the memory 106 may also be emulated. The physical implementation of the memory 106 may be communicatively coupled to the processor 104 through a memory controller. The memory 106 may be provide read and write access for the processor 104 to allow the processor to retrieve instructions or code from memory for execution on the processor.

A precompiled binary 108 may be utilized by the processor 104. In an implementation, the precompiled binary 108 may include instructions for executing a software application on the processor 104. The precompiled binary 108 may be the result of a software development process including the writing of an program in a high-level language. The program may be represented in a computing system as a source file or source document. The precompiled binary 108 may be a resultant conversion of an executable control block from the source file to an object file or machine code. The precompiled binary 108 may include references to external libraries distributed by a third party. The references may be included within the precompiled binary 108 (e.g. static linking), or the references may be resolved by the linker to reference a library loaded separately into memory 106 at execution time (e.g. dynamic linking). A precompiled binary 108 may include a precompiled library as provided by a third party. In another implementation, the precompiled binary 108 may include a precompiled binary patch used for applying corrective code to resolve a software bug.

Within the memory 106 may be a shared function address space 110. The shared function address space 110 may be a logical address space within the memory 106. The shared function address space 110 may be a contiguous memory segment or, in another implementation, a noncontiguous memory segment that is addressable from a main program block.

Within the shared function address space 110 may be a hash map 112. The hash map 112 may be a logical allocation of memory within the shared function address space 110 and may include at least one entry. Each of the entries may include a hash signature corresponding to a hashing of an executable control block and a corresponding executable control block. In another implementation, the hash map 114 may include the hash signature and a reference to an address in the shared function address space 110, where the corresponding executable control block may be addressed.

The hashes 110A, 110B, 110C, 110X may be generated by cryptographic hashing algorithms. The executable control blocks 112A, 112B, 112C, 112X, may be utilized as the input into the hashing algorithm. The hashing algorithm may produce a unique value based on the input. If an executable control block is updated, a new unique hash 110A, 110B, 110C, 110X may be generated, wherein the function signature may remain the same. The hashes (also referred to as digests, or hash signatures) may be the result of a one-way hashing function with the one of the corresponding executable control blocks 112A, 112B, 112C, 112X as an input. In some implementations, the one-way hashing function may include but not be limited to MD5 and SHA cryptographic hashing algorithms.

The executable control blocks 112A, 112B, 112C, 112X may be functional blocks of precompiled code with entry and return points. The executable control blocks 112A, 112B, 112C, 112X may exist in the shared function address space 110. The executable control blocks 112A, 112B, 112C, 112X may include binary code representative of instructions corresponding to the platform architecture of the processor 104. The executable control blocks 112A, 112B, 112C, 112X may be implementations of functions corresponding to a larger software package. The executable control blocks 112A, 112B, 112C, 112X may be address through the hash map 114 based on the hashes 110A, 110B, 110C, 110X.

Figure 2:
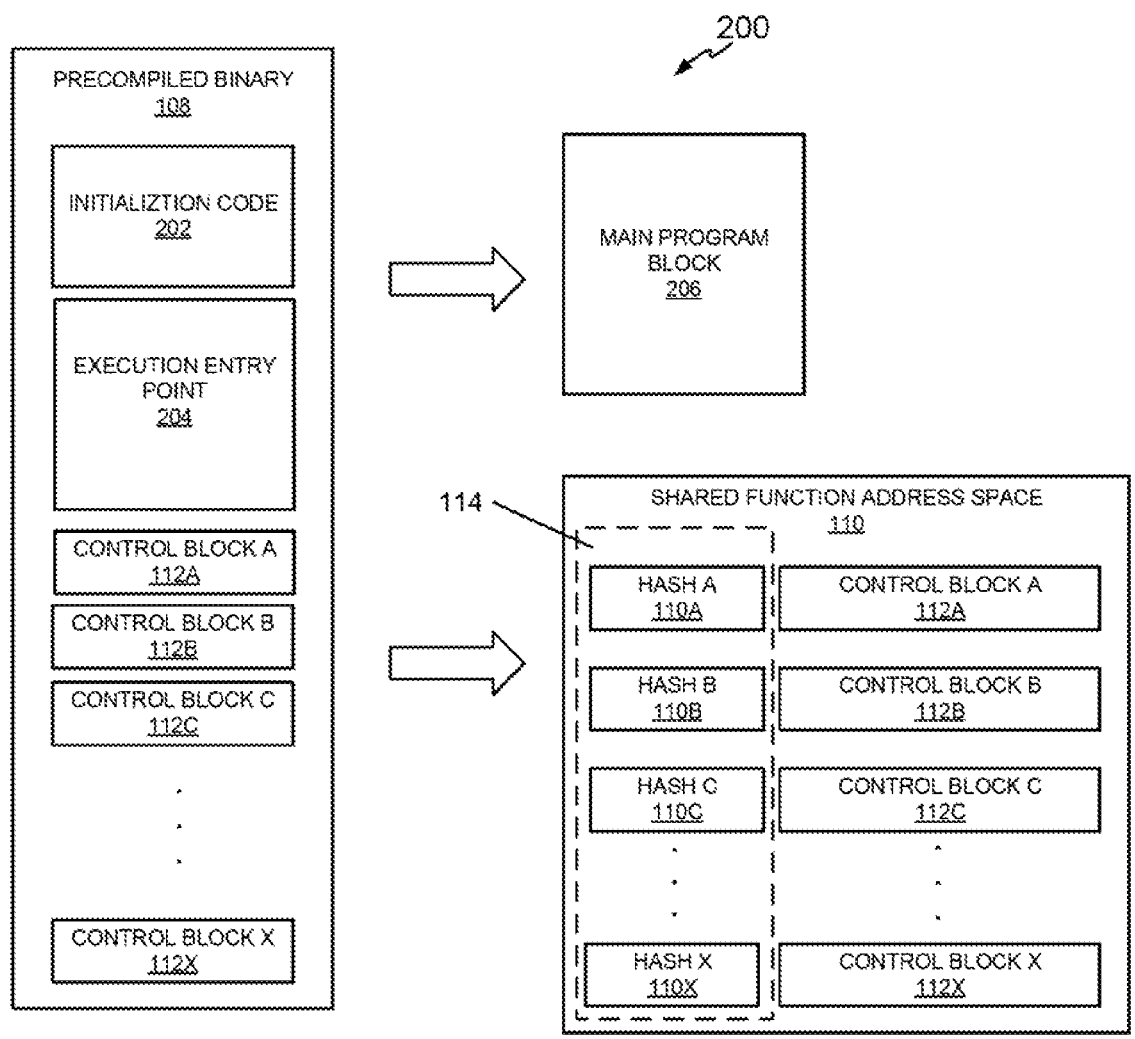
FIG. 2 illustrates the transition of a precompiled executable binary; to a hash map of executable control blocks, according to an example.

FIG. 2 illustrates the transition 200 of a precompiled executable binary to a hash map 114 of executable control blocks, according to an example. The transition of a precompiled executable binary to a hash map 114 may be facilitated by a processor 104 (see FIG. 1). A precompiled binary 108 may include initialization code 202, execution entry point 204, and a number of executable control blocks 112A, 112B, 112C, 112X.

The initialization code 202 of a precompiled binary 108 may include one-setup actions for the execution of the software application implemented in the precompiled binary 108. The initialization of global variable attributes, static objects, and class objects are examples of software constructs that are implemented in the initialization code 202. In some implementations, the initialization code 202 may be implicitly defined within a software source document which is compiled to become the precompiled binary 108.

The execution entry point 204 may be as section of the precompiled binary that may include an entry point for the code (e.g. main( ) function). The execution entry point 204 may include both the entry point and exit point for the precompiled binary and may include logic for overall execution control. In interactive applications, the overall execution control may include a polling or event loop to detect interaction input from a user and call corresponding executable control blocks 112A, 112B, 112C, 112X for the specific interaction input.

The executable control blocks 112A, 112B, 112C, 112X correspond to computer programming functions, methods or subroutines. The executable control blocks 112A, 112B, 112C, 112X may receive inputs in the form of parametrized lists which the executable control blocks manipulate programmatically to achieve a result. The executable control blocks 112A, 112B, 112C, 112X may include a name, and conjunction with the parametrized lists, thereby have a function signature which identifies that specific execution control block. In some implementations, the function returns a resultant object, which may also be used in determining a function signature. In more than one implementation the executable control blocks 112A, 112B, 112C, 112X may comprise the majority of the executable code of a software application.

When transitioning to the hash map 114 implementation, the modification of the link step in application compilation may generate each of the unique hashes 110A, 110B, 110C, 110X for each of the executable control blocks 112A, 112B, 112C, 112X. In another implementation, scanning of the executable binary 108 at the end, of compilation may be used to find boundaries or the executable control blocks 112A, 112B, 112C, 112X and performing the above described hashing. Upon scanning, the entries in the hash map 114 may be updated to correspond to hashes 110A, 110B, 110C, 110X and executable control blocks 112A, 112B, 112C, 112X of those boundaries.

In the transition of the precompiled executable binary, the main program block 206 may be updated to reference the hash map 114. The main program block 206 may exist in memory 106 (see FIG. 1) however, separate from the shared function address space 110. The main program block 206 may include instructions corresponding to the initialization code 202 and the execution entry point 204. Additionally, the main program block 206 may include references to the executable control blocks 112A, 112B, 112C, 112X based on function signature as described above. The references may include a table look up for memory addresses where the respective executable control blocks 112A, 112B, 112C, 112X based on their signatures are located in memory. Calls to the executable control blocks 112A, 112B, 112C, 112X may be referenced based on these signatures.

In the transition, the main program block 206 may be updated to reference the hash map 114. Utilizing the hash map 114 instead of function signature allows for consistency and deduplication. For example, two executable control blocks with the same code and parameters may generate one unique hash in the hash map 114. In this implementation, the main program block 206 may be updated to reference one hash-mapped executable control block at both function calls and the duplicate may be discarded saving memory footprint. In another implementation, utilizing hash mapping allows for in-memory patching. A precompiled binary patch, including updates to the precompiled binary, may be loaded by the processor 104. The patch may include updates from an object code to at least one executable control blocks. The hash map 114 may be updated to include the new entries corresponding to the new unique hashes that the patched executable control blocks generate, and subsequent updates to the main program block 206 may be effectuated.

As described above in reference to FIG. 1, the shared function address space 110 provides a memory area to contain the hash map 114 and the executable control blocks 112A, 112B, 112C, 112X. The shared function address space 110 may expand and contract as patches are applied and deprecated (or unreferenced) executable control blocks 112A, 112B, 112C, 112X are deleted. Similar to the shared function address space 110, the hash map 114, hashes 110A, 110B, 110C, 110X, and executable control blocks 112A, 112B, 112C, 112X may expand and contract within the shared function address space 110 as the operating system warrants. The operating system kernel may control the hash map 114 and the shared memory address space for security and consistency of operation. In an implementation, the hash map 114 may persist outside of the execution of the main program block 206. In this implementation, the processor 104 may remove entries in the hash map 114 corresponding to an executable control block 112A, 112B, 112C, 112X corresponding to the respective precompiled binary 108 exiting execution. The result may include the hash map 114 maintaining a hash map of library functions that persist and are utilized by more than one precompiled binary 108.

Figure 3:
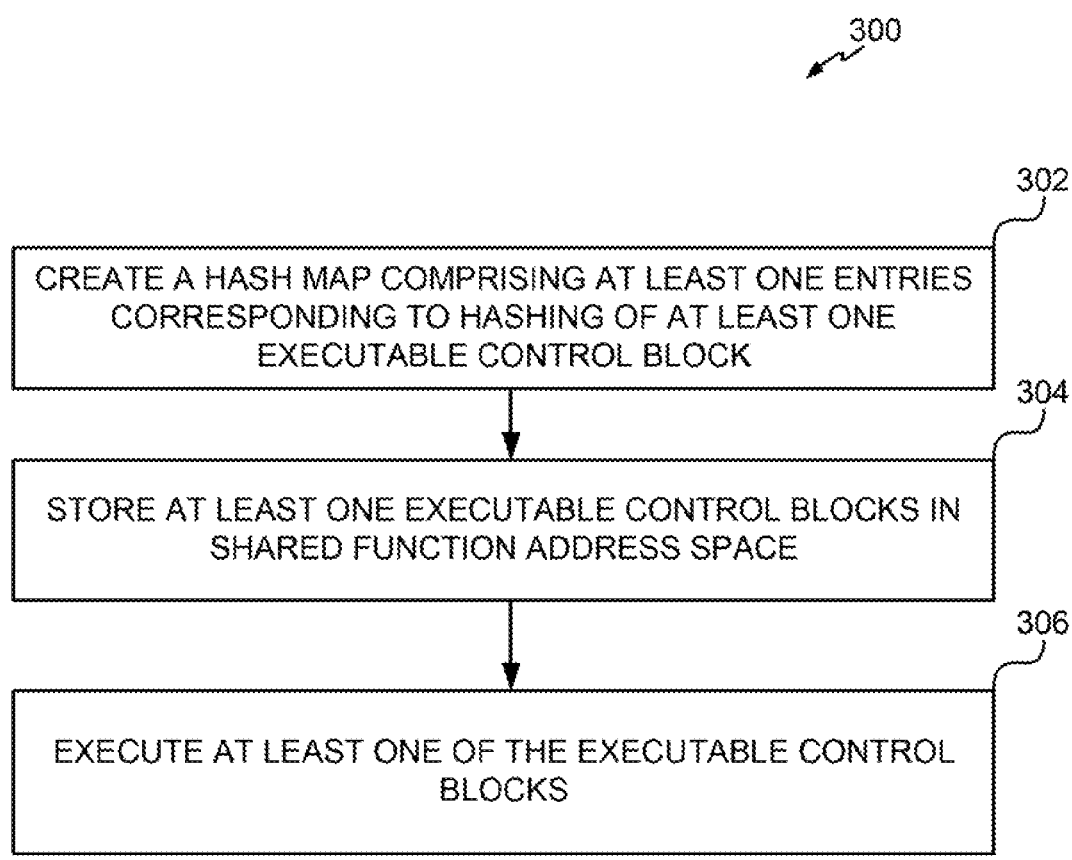
FIG. 3 is a flow diagram illustrating a method for implementing a hash map of executable control blocks, according to an example.

FIG. 3 is a flow diagram 300 illustrating a method for implementing a hash map 114 of executable control blocks. In describing the method for implementing a hash map 114 of executable control blocks 112A, 112B, 112C, 112X, the description may refer to structural components described in FIGS. 1 and 2 to provide clarity and structure.

At 302, the processor 104 creates a hash map 114 comprising at least one entry corresponding to hashing of at least one executable control blocks 112A, 112B, 112C, 112X. The entries in the hash map 114 may include hashes 110A, 110B, 110C, 110X derived from the one-way hashing of the instructions inclusive to the executable control blocks 112A, 112B, 112C, 112X.

At 304, the processor 104 stores at least one executable control blocks in shared function address space. The executable control blocks 112A, 112B, 112C, 112X may be stored with corresponding hashes 110A, 110B, 110C, 110X as identifiers are to the executable control blocks 112A, 112B, 112C, 112X stored at those locations. In another implementation, an executing executable control block may reference another executable control block. In this implementation, the executing executable control block may index into the hash map 114 and call another executable control block. For example, executable control block A 112A, may reference executable control block B 112B. Executable control block. A 112A may be updated to refer to the Hash C 110C corresponding to executable control block C 112C. Executable control block A 112A may then pass control of execution to executable control block C 112C upon reference.

At 306, the processor 104 executes at least one of the executable control blocks. The processor 104 may execute the main program block 206 and thereby reference or index into the hash map 114. The corresponding indexing provides a look up to the executable control blocks 112A, 112B, 112C, 112X called within the main program block 206.

Figure 4:
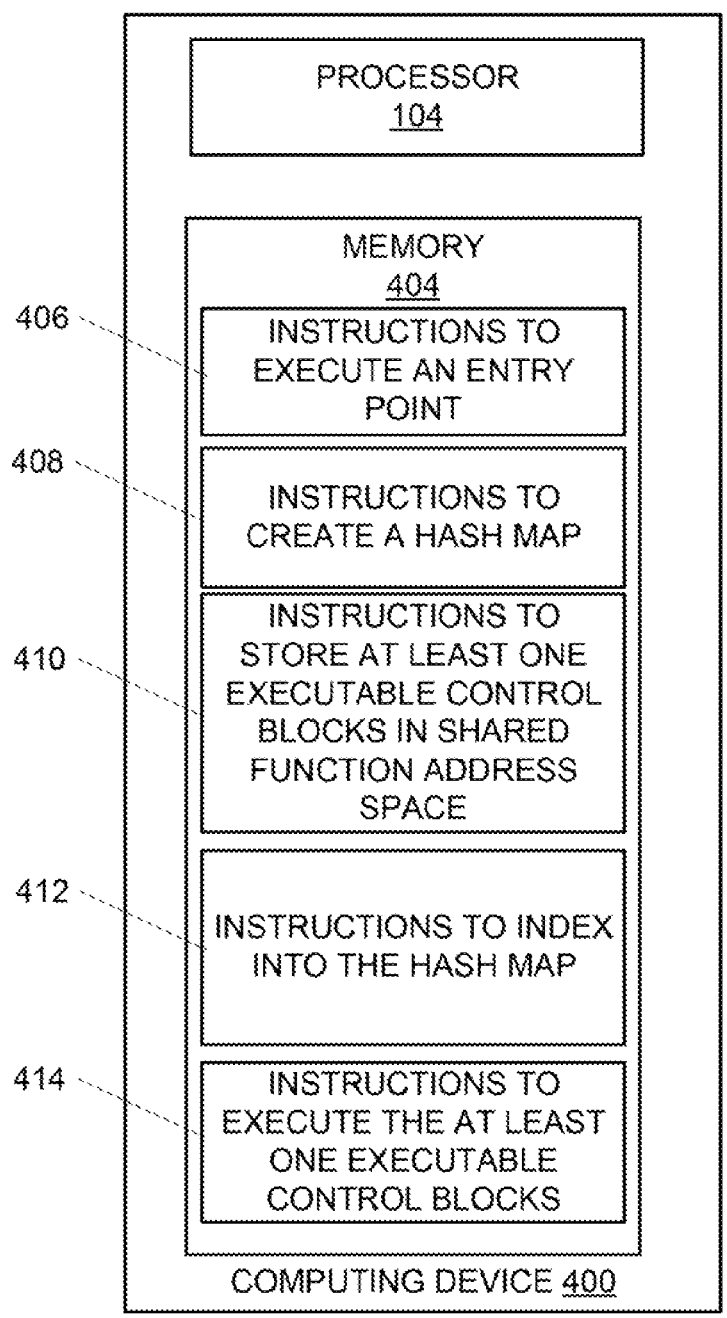
FIG. 4 is a computing device for supporting a hash map of executable control blocks, according to an example.

FIG. 4 is a computing device for supporting a hash map 114 of executable control blocks, according to an example. The computing device 400 depicts a processor 104 and a memory device 404 and, as an example of the computing device 400 performing its operations, the memory device 404 may include instructions 406-414 that are executable by the processor 104. The processor 104 may be synonymous with the processor found in common computing environments including but not limited to central processing units (CPUs). The memory device 404 can be said to store program instructions that, when executed by processor 104, implement the components of the computing device 400. The executable program instructions stored in the memory device 404 include, as an example, instructions to execute an entry point 406, instructions to create a hash map 408, instructions to store at least one executable control blocks in a shared function address space 410, instructions to index into the hash map 412, and instructions to execute the at least one executable control blocks 414.

Memory device 404 represents generally any number of memory components capable of storing instructions that can be executed by processor 104. Memory device 404 is non-transitory in the sense that it does not encompass a transitory signal but instead is made up of at least one memory component configured to store the relevant instructions. As a result, the memory device 404 may be a non-transitory computer-readable storage medium. Memory device 404 may be implemented in a single device or distributed across devices. Likewise, processor 104 represents any number of processors capable of executing instructions stored by memory device 404. Processor 104 may be integrated in a single device or distributed across devices. Further, memory device 404 may be fully or partially integrated in the same device as processor 104, or it may be separate but accessible to that device and processor 104.

In one example, the program instructions 406-414 can be part of an installation package that, when installed, can be executed by processor 104 to implement the components of the computing device 400. In this case, memory device 404 may be a portable medium such as a CD, DVD, or flash drive, or a memory maintained by a server from which the installation package can be downloaded and installed. In another example, the program instructions may be part of an application or applications already installed. In another example, the memory device 404 may be internal flash memory to a computing device, wherein the program instructions 406-414 may be installed from the computing device manufacturer. It should be appreciated that the program instructions may also implement the processor controlled flow diagram 300. Here, memory device 404 may include integrated memory such as a flash ROM, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
a memory;
a processor, communicatively coupled to the memory to:
  receive a precompiled binary executable, wherein the precompiled binary executable comprises an executable control block;

create a hash map comprising an entry wherein the entry corresponds to a hashing of the executable control block;

store the executable control blocks in a shared function address space, wherein the executable control block corresponds to the entry in the hash map and is addressable based at least in part by the hash map.

2. The system of claim 1, the processor further to:

update the hash map with a precompiled binary patch, wherein the patch comprises a change in a source code corresponding to the executable control block; and update the executable control block in the shared function address space during an execution of a program corresponding to the source code document.

3. The system of claim 1, the processor further to:

scan the precompiled binary executable to determine a set of boundaries corresponding to the executable control block; and update the entry in the hash map wherein the entry correspond to each of set of boundaries.

4. The system of claim 1, the processor further to:

remove an entry in the hash map corresponding to the executable control block associated with an application ceasing execution.

5. The system of claim 1, wherein the hash map and the shared memory address space are kernel controlled.

6. A method comprising:

creating a hash map comprising at least one entry wherein each of the entries corresponds to a hashing of each of at least one executable control blocks;

storing the at least one executable control blocks in a shared function address space, wherein each of the at least one executable control blocks corresponds to an entry in the hash map and is addressable based at least in part by the hash map;

executing one of the at least one executable control blocks, based on a processor referencing a corresponding entry in the hash map.

7. The method of claim 6 further comprising:

updating the hash map based on a source code document patch, wherein the patch comprises a change in a source code corresponding to the at least one executable control blocks; and updating the at least one executable control blocks in the shared function address space during an execution of a program corresponding to the source code document.

8. The method of claim 6, further comprising:

scanning a precompiled executable binary to determine a set of boundaries corresponding to each of the at least one executable control blocks; and updating the entries in the hash map wherein the entries correspond to each of set of boundaries.

9. The method of claim 6 further comprising:

removing an entry in the hash map corresponding to an executable control block associated with an application ceasing execution.

10. The method of claim 6, wherein the hash map and the shared memory address space are kernel controlled.

11. A non-transitory machine-readable storage medium comprising instructions executable by a processor to:

execute an entry point of a software application code;

create a hash map comprising at least one entries wherein each of the entries corresponds to a hashing of each of at least one executable control blocks corresponding to the software application code;

store the at least one executable control blocks in a shared function address space, wherein each of the at least one executable control blocks correspond to an entry in the hash map and is addressable based at least in part by the hash map;

index into the hash map; and execute one of the at least one executable control blocks, corresponding to the indexing.

12. The storage medium of claim 1 the instructions executable by a processor further comprise:

update the hash map based on a precompiled binary patch, wherein the patch comprises a change in a source code corresponding to the at least one executable control blocks; and update the at least one executable control blocks in the shared function address space during an execution of a program corresponding to the patch.

13. The storage medium of claim 12, the instructions executable by a processor further comprise:

scan the patch to determine a set of boundaries corresponding to each of the at least one executable control blocks; and update the entries in the hash map wherein the entries correspond to each of set of boundaries.

14. The storage medium of claim 11, the instructions executable by a processor further comprise:

remove an entry in the hash map corresponding to executable control block associated with an application ceasing execution.

15. The storage medium of claim 11, wherein the hash map and the shared memory address space are kernel controlled.

* * * * *